United States Patent
Schmitt et al.

(10) Patent No.: US 12,215,801 B2
(45) Date of Patent: Feb. 4, 2025

(54) VALVE PACKING APPARATUS AND RELATED METHODS

(71) Applicant: Fisher Controls International LLC, Marshalltown, IA (US)

(72) Inventors: Lucas Schmitt, Conrad, IA (US); Steven Hostetter, Colfax, IA (US); Aaron Anderson, Marshalltown, IA (US); Lisa Miller, Marshalltown, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 0 days.

(21) Appl. No.: 17/896,872

(22) Filed: Aug. 26, 2022

(65) Prior Publication Data

US 2024/0068596 A1    Feb. 29, 2024

(51) Int. Cl.
*F16K 41/02*     (2006.01)
*F16K 41/16*     (2006.01)

(52) U.S. Cl.
CPC .............. *F16K 41/02* (2013.01); *F16K 41/16* (2013.01)

(58) Field of Classification Search
CPC .......... F16K 41/02; F16K 41/16; F16K 43/00; F16K 41/04; F16K 41/026; F16K 41/043; F16J 15/348; F16J 15/3464; F16J 15/184; F16J 15/20; F16J 23/18
USPC ....... 251/337, 214; 137/315.11, 316, 315.41, 137/315.42; 277/108, 370, 371, 375, 435, 277/511, 630
See application file for complete search history.

(56) References Cited

U.S. PATENT DOCUMENTS

| | | | |
|---|---|---|---|
| 4,186,761 A * | 2/1980 | Guarnieri | F16L 5/027 137/315.15 |
| 4,289,317 A | 9/1981 | Kuc | |
| 5,078,175 A | 1/1992 | Martin et al. | |
| 5,230,498 A | 7/1993 | Wood et al. | |
| 5,238,252 A * | 8/1993 | Stewen | F16K 41/02 251/330 |
| 5,263,682 A * | 11/1993 | Covert | F16K 41/046 277/517 |
| 5,584,219 A * | 12/1996 | Dunn | E06B 3/677 83/660 |
| 5,743,288 A | 4/1998 | Mosman et al. | |
| 6,167,959 B1 | 1/2001 | Bassinger et al. | |
| 6,673,201 B2 | 1/2004 | Vogel et al. | |

(Continued)

OTHER PUBLICATIONS

United States Patent and Trademark Office, "Non-Final Office Action," issued Sep. 22, 2023 in connection with U.S. Appl. No. 17/896,768, 22 pages.

(Continued)

*Primary Examiner* — Craig M Schneider
*Assistant Examiner* — Andrew J Rost
(74) *Attorney, Agent, or Firm* — Hanley, Flight & Zimmerman, LLC

(57) ABSTRACT

Methods, apparatus, systems, and articles of manufacture of valve packing apparatus and related methods. An apparatus includes a cartridge including packing components and a spring. The cartridge is dimensioned to fit in a bore of a bonnet of a valve. A retainer is disposed in an aperture of the cartridge. The retainer is removable from the aperture to release the spring to apply a predetermined compressive load to the stack of packing components.

20 Claims, 8 Drawing Sheets

(56) References Cited

U.S. PATENT DOCUMENTS

| | | | |
|---|---|---|---|
| 7,963,502 B2* | 6/2011 | Lovell | F16K 41/02 |
| | | | 251/214 |
| 8,100,407 B2* | 1/2012 | Stanton | F16J 15/183 |
| | | | 277/522 |
| 8,281,797 B2 | 10/2012 | Brestel | |
| 8,469,057 B2* | 6/2013 | Gamache | F16K 11/20 |
| | | | 137/625.48 |
| 8,622,367 B2 | 1/2014 | Lovell et al. | |
| 8,863,768 B2 | 10/2014 | Kang | |
| 9,863,552 B2 | 1/2018 | Fan | |
| 2012/0153202 A1* | 6/2012 | Lin | F16K 1/126 |
| | | | 251/214 |
| 2017/0097107 A1* | 4/2017 | Hotz | F16K 41/02 |

OTHER PUBLICATIONS

United States Patent and Trademark Office, "Final Office Action," issued Apr. 24, 2024 in connection with U.S. Appl. No. 17/896,768, 20 pages.

United States Patent and Trademark Office, "Non-Final Office Action," issued Sep. 25, 2024 in connection with U.S. Appl. No. 17/896,768, 28 pages.

* cited by examiner

VALVE PACKING APPARATUS AND RELATED METHODS

FIELD OF THE DISCLOSURE

This disclosure relates generally to fluid valves and, more particularly, to valve packing apparatus and related methods.

BACKGROUND

Process control systems often employ fluid valves to regulate process fluids. A typical fluid valve controls fluid flow by moving a plug, ball, or other fluid flow control member within the fluid flow path of the valve. To manipulate the fluid flow control member, a sliding stem or rotating shaft may be coupled to an actuator (e.g., a pneumatic actuator, a hydraulic actuator, a manual actuator, etc.). To prevent unintended leakage of process fluid from the valve along the valve stem or shaft, fluid valves commonly utilize a packing assembly that seals the valve stem or shaft to a body (e.g., bonnet portion) of the valve.

A valve packing typically includes an assembly of components such as springs, spacers (e.g., lantern rings), wipers, and seals, all of which are arranged in a particular order (e.g., or stack) along the valve stem or shaft, and which are properly loaded to prevent leakage. The components of a valve packing may deteriorate over time and, thus, the valve packing may be serviced (e.g., replaced) during the service life of the valve to restore the leakage prevention characteristics of the packing. Installation of a valve packing during manufacture of a valve or during field service of a valve is often a complex, difficult and error-prone process. For example, the components of a valve packing assembly must typically be installed in a particular order and orientation for the packing to function properly. Installation of the components in the wrong order or orientation and/or damaging one or more of the components during installation can lead to undesired leakage past the packing and to the environment via a bonnet. Further, a precise load (e.g., a compressive load) is typically applied to the installed packing components to establish a proper seal to achieve the desired leakage characteristics. More specifically, if the applied packing load or stress is too low, unacceptable leakage of process fluid into the surrounding environment may result. On the other hand, if the applied packing load or stress is too high, an unacceptable amount of friction between the packing components and the valve stem or shaft may result in excessive, premature wear of the packing and, thus, a reduced service life of the packing and/or the valve or, more generally, decreased performance of the valve.

Figure 1:
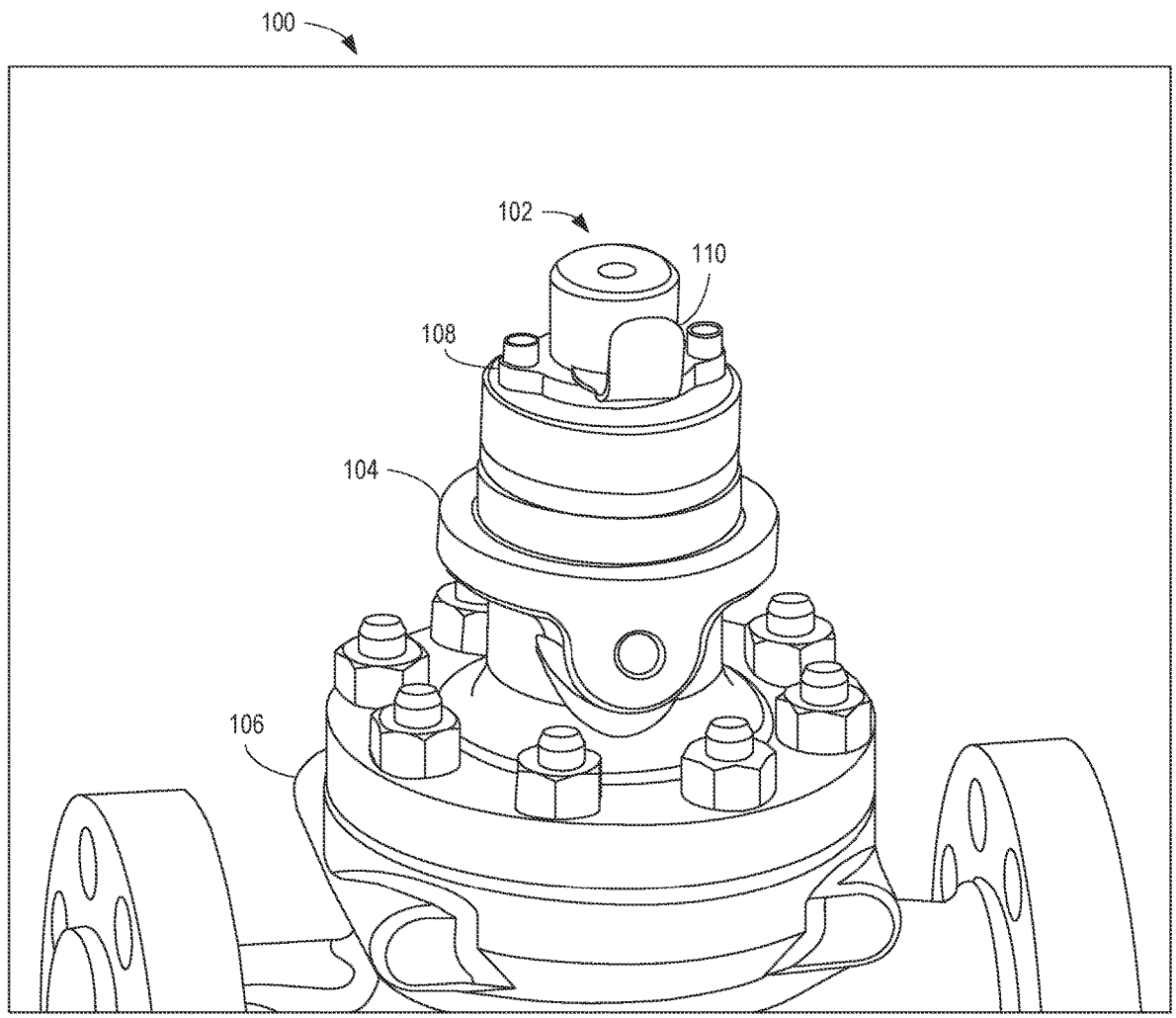
FIG. 1 illustrates an example fluid control valve having an example valve packing cartridge assembly constructed in accordance with the teachings of this disclosure.

In general, the same reference numbers will be used throughout the drawing(s) and accompanying written description to refer to the same or like parts. The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

SUMMARY

In one example, an apparatus to install a valve packing includes a cartridge having packing components and a spring, the cartridge is dimensioned to fit in a bore of a bonnet of a valve. A retainer is disposed in an aperture of the cartridge to prevent the spring from applying a compressive load to the packing components. The retainer, when removed from the aperture, is to release the spring to apply a predetermined compressive load to the packing components.

In another example, an apparatus to install a valve packing includes a cylindrical tube having a first end and a second end, the tube having an outer surface dimensioned to fit within a bore of a valve. A biasing member is disposed within the tube at the first end of the tube, packing components are disposed within the tube adjacent to the biasing member and a retainer holds the biasing member in a compressed state to prevent the biasing member from contacting the packing components. The retainer is to be moved to enable the biasing member to apply a load to the packing components after the cylindrical tube has been inserted into the bore of the valve.

In another example, an apparatus to install a valve packing includes means for applying a predetermined compressive load to packing components and means for retaining the means for applying the predetermined compressive load.

DETAILED DESCRIPTION

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real-world imperfections as will be understood by persons of ordinary skill in the art. For example, "approximately" and "about" may indicate such dimensions may be within a tolerance range of +/−10% unless otherwise specified in the below description.

In general, fluid control valves are implemented with valve packing components (e.g., seals) that are loaded (e.g., under a compressive load) to achieve a desired leakage characteristic (e.g., fluid tight or approximately zero leakage). For example, a sliding stem fluid valve has valve packing components (e.g., lantern rings, seals, springs, v-rings) surrounding a valve stem within a bore of a bonnet. Valve packing components are inserted into the bonnet of a valve during the initial manufacturing process or while the valve packing is being serviced in the field. Traditionally, to adjust the compressive load imparted to the valve packing assembly, fasteners (e.g., nuts, bolts, etc.) are manipulated to increase or decrease the compressive force applied to the packing components. As the compressive force increases to provide a load on the packing, sealing components of the packing assembly compress to cause inner of the seals to expand radially toward a stem or a shaft and/or outer surfaces of the seals to expand radially toward an inner surface of a packing bore of a bonnet to provide a seal. Thus, during initial manufacture or service of the valve, the packing components must be inserted into the bonnet in the correct order and orientation and without damaging the components. Further, the fasteners that load the packing components must be tightened precisely to ensure the packing has sufficient loading to function properly and have a long service life. However, the above-mentioned known packing installation process is difficult and error-prone, particularly in a field service situation.

The example methods and apparatus described herein ensure the installation of valve packing components in the correct order and orientation and, additionally, ensure application of a precise pre-determined compressive load on the packing components while eliminating the need for a person to manually adjust the load during installation of the valve packing components.

FIG. 1 is an example fluid valve 100 having an example valve packing cartridge assembly 102 installed within the fluid valve 100. In the example of FIG. 1, the fluid valve 100 is a sliding stem fluid valve. However, in other examples, the valve packing cartridge assembly 102 may be implemented in any other type of valve (e.g., a rotary valve). In the illustrated example, the valve packing cartridge assembly 102 is coupled to (e.g., disposed within) a bonnet 104 of the fluid valve 100 that is coupled to a valve body 106 of the fluid valve 100. The valve packing cartridge assembly 102 is coupled to the bonnet 104 via a flange 108. In other examples, the valve packing cartridge assembly 102 is coupled to the bonnet 104 of the fluid valve 100 via other means (e.g., a flange separate from the valve packing cartridge assembly 102). As described in greater detail below, a retainer 110 disposed in the valve packing cartridge assembly 102 retains a biasing element internal to the valve packing cartridge assembly 102 to prevent loading of packing components within the valve packing cartridge assembly 102 during at least a portion of the process for installing the valve packing cartridge assembly 102 in the fluid valve 100. To complete the installation process, the retainer 110 is moved (e.g., removed by hand or by using a tool such as pliers) by, for example, pulling the retainer 110 away from or out of the valve packing cartridge assembly 102 to enable the biasing element to apply a predetermined compressive load to the packing components within the valve packing cartridge assembly 102.

Figure 2:
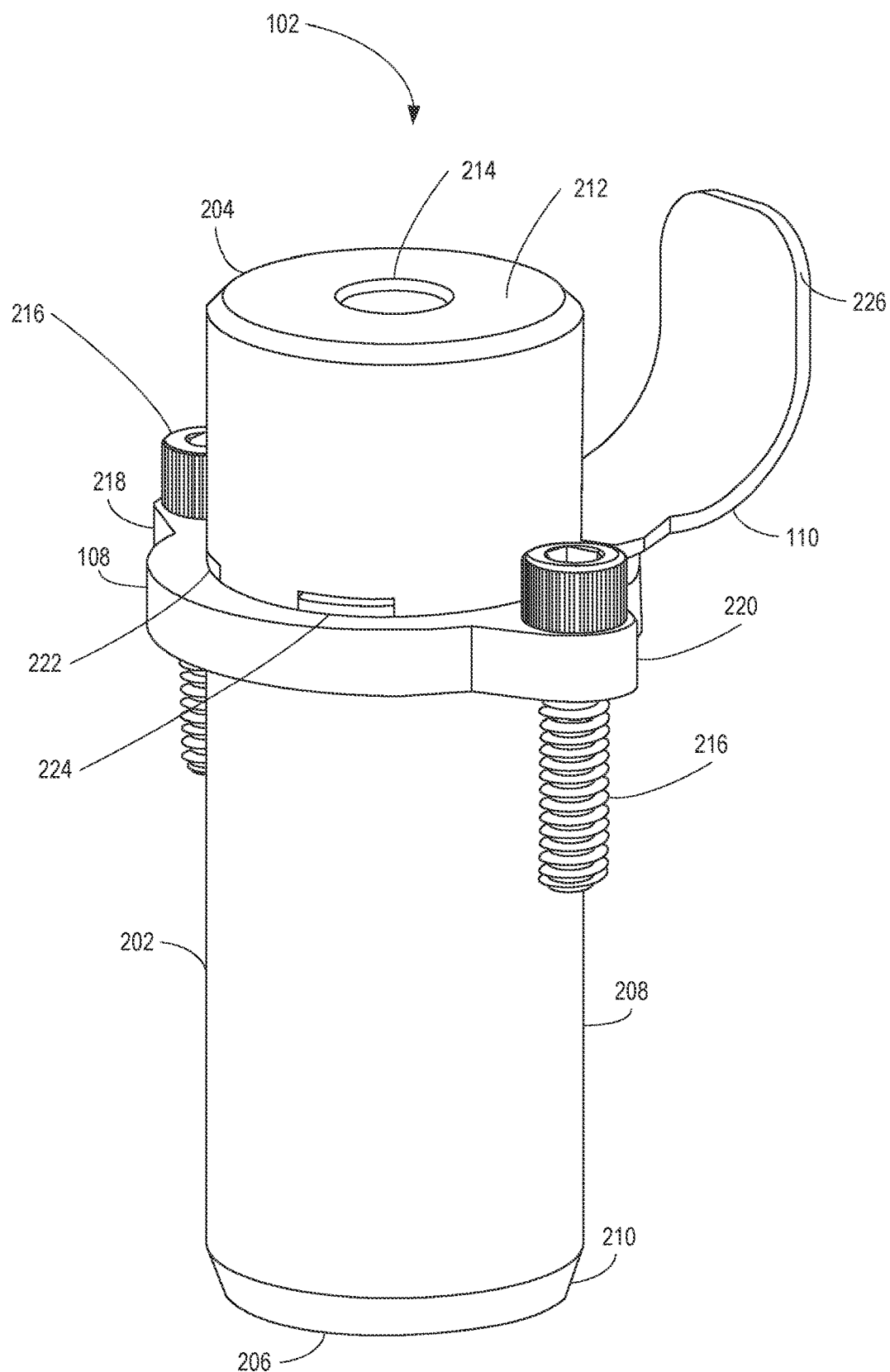
FIG. 2 is an enlarged view of the example valve packing cartridge assembly of FIG. 1.

FIG. 2 is an enlarged view of the example valve packing cartridge assembly 102 of FIG. 1. As shown in FIG. 2, the valve packing cartridge assembly 102 includes a cartridge 202 having a first end 204 and a second end 206 opposite the first end 204. The cartridge 202 in this example is a generally cylindrical tube having an outer surface 208 that is dimensioned (e.g., has a diameter) to fit within a valve (e.g., a bore of the bonnet 104 of FIG. 1, a valve body, etc.). The second end 206 of the cartridge 202 has a chamfered portion 210 to guide and facilitate insertion of the cartridge 202 into a valve. Additionally, the cartridge 202 may be lubricated (e.g., using grease) to enable a low-friction installation of the valve packing cartridge assembly 102. The first end 204 of the cartridge 202 includes an end cap or wall portion 212 that functions as a seat for a biasing element within the cartridge 202 as described in greater detail below. The wall portion 212 includes a central aperture 214 that is sized to receive a stem or shaft of a valve into which the valve packing cartridge assembly 102 is to be installed.

The cartridge 202 also includes the flange 108 that receives bolts 216 to couple (e.g., fasten) the valve packing cartridge assembly 102 to a valve body (e.g., a bonnet portion of a valve body). In the illustrated example, the flange 108 has two ears 218, 220 through which the bolts 216 pass, but additional ears or other features to receive fasteners may be added or used instead of the ears 218, 220. In other examples, the flange 108 may not be integrated with the cartridge 202. For example, the valve packing cartridge assembly 102 may be coupled to a valve using additional means (e.g., a separate flange). The cartridge 202 and the flange 108 may be made of a metallic material. For example, the cartridge 202 and the flange 108 may be made of a metallic material more corrosion resistant than the material of the bonnet 104. In some examples, the flange 108 is made of a metallic material different than the cartridge 202. The bolts 216 provide a means for coupling the valve packing cartridge assembly 102 to a valve (e.g., the bonnet 104 of FIG. 1). However, in other examples, alternate means for coupling are used (e.g., screws, nuts and bolts, clamps, etc.)

As shown, the cartridge 202 includes an aperture 602 (e.g., a slot) opposite apertures 222, 224 (e.g., holes, separate slots, etc.). In the illustrated example, the retainer 110 is disposed in the aperture 602 (FIG. 6) (e.g., a slot) of the cartridge 202 such that the retainer 110 extends at least partially through (e.g., a diameter of) the cartridge 202 and legs or tines 604, 606 (FIG. 6) of the retainer 110 extend into the corresponding apertures 222, 224 opposite the aperture 602 (FIG. 6) to enable the retainer 110 to prevent the internal biasing member (e.g., one or more springs) within the valve packing cartridge assembly 102 from applying a compressive load to packing components within the valve packing cartridge assembly 102 while the retainer 110 is coupled to the cartridge 202 (e.g., during the initial installation of the valve packing cartridge assembly 102 into a valve, during shipment of the cartridge 202 from the factory, etc.). For example, the retainer 110 may retain the biasing element under compression and, once a valve stem is inserted through the central aperture 214, the retainer 110 may be removed to release the biasing element to apply a compressive load to the packing components. As depicted in FIG. 2, the retainer 110 is generally tab-like and has a curved end 226 to facilitate grasping via a person's hand and/or via a tool during movement (e.g., pulling and removal) of the retainer 110 to allow the internal biasing element to apply a predetermined compressive load to the packing components at the completion of the installation of the valve packing cartridge assembly 102 into a valve. While in the illustrated example the retainer 110 is generally tab-like, the retainer 110 can be any other retaining element (e.g., a bar, a pin, etc.).

Figure 3:
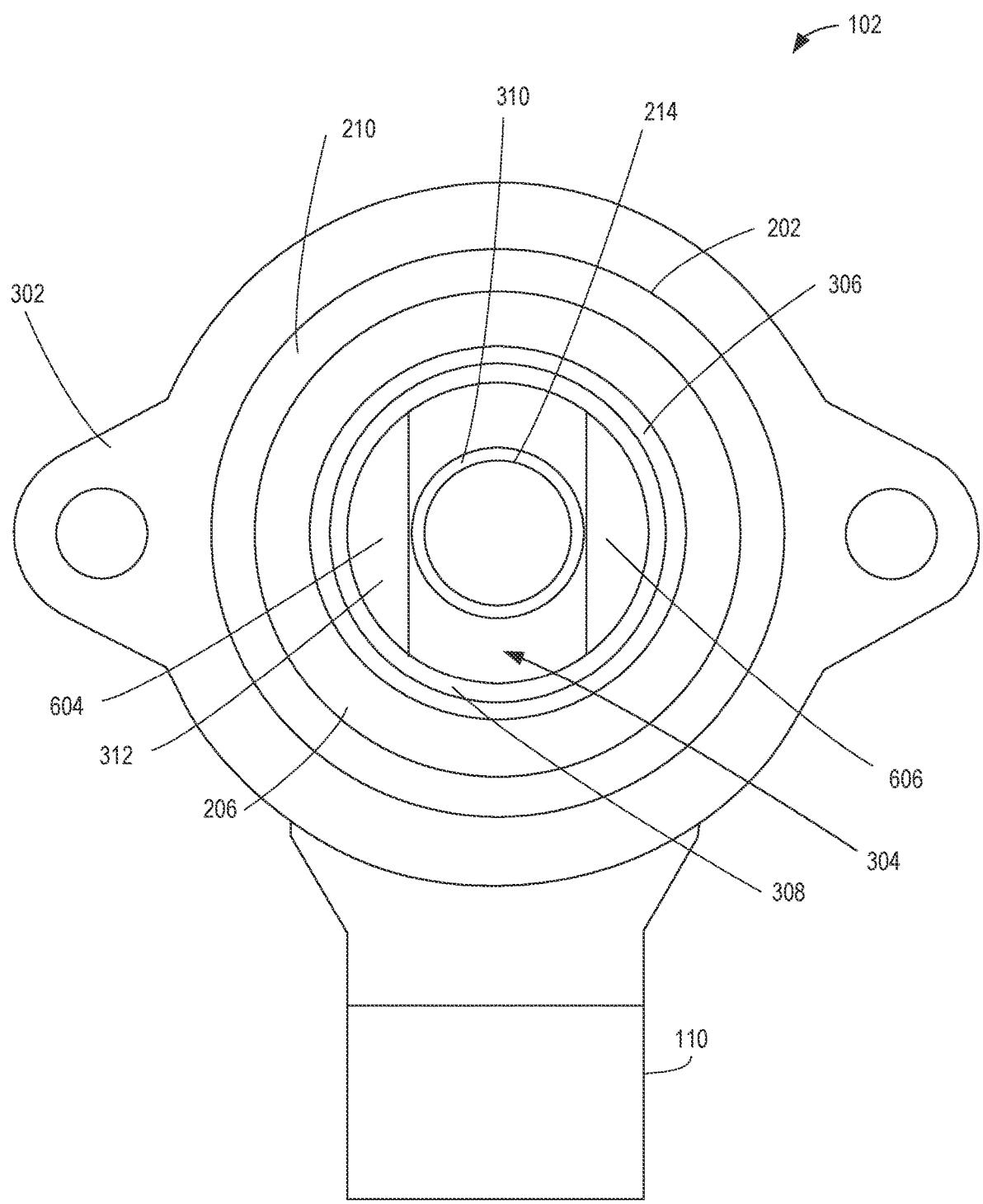
FIG. 3 depicts the example valve packing cartridge assembly of FIGS. 1-2 when viewed from a flange mating surface side and with the retainer installed.

FIG. 3 depicts the valve packing cartridge assembly 102 of FIGS. 1-2 when viewed from a flange mating surface side 302 with the retainer 110 installed. Disposed through the body of the cartridge 202 is the retainer 110. Disposed on both sides of the central aperture 214 are portions of the tines 604, 606 (FIG. 6) of the retainer 110. During assembly of the cartridge 202, a generally rectangular gap or space 304 between the tines 604, 606 (FIG. 6) of the retainer 110 enables a tool (e.g., a press) to move between and past the tines 604, 606 to compress the internal biasing element (e.g., one or more springs) of the valve packing cartridge assembly 102 while the retainer 110 is inserted into the cartridge 202 (e.g., and enable the tines 604, 606 engage the respective openings 222, 224). When the tool is subsequently removed, the internal biasing element is stopped by the retainer 110 from applying any compressive force to the packing components within the valve packing cartridge assembly 102. Additionally, once the valve packing cartridge assembly 102 is installed in a valve (e.g., the fluid valve 100 of FIG. 1) the rectangular space 304 allows for a valve stem 500 (FIG. 5) to pass between the tines 604, 606 (FIG. 6) before the retainer 110 is removed to release the biasing element to apply a compressive load to the packing components.

The second end 206 of the cartridge 202 has the chamfered portion 210 to guide and facilitate insertion of the cartridge 202 into a valve. Additionally, disposed at the second end 206, internal to the cartridge 202, is an internal chamfer 306. The internal chamfer 306 helps guide the insertion of a stack of packing components 400 (FIG. 4) and the installation of a packing retaining ring 308 into the cartridge 202. Disposed at the first end 204 (FIG. 2) of the cartridge 202 along the circumference of the central aperture 214 is a central aperture chamfer 310. The central aperture chamfer 310 guides the movement of the valve stem 500 (FIG. 5) as it moves through the central aperture 214.

Figure 6:
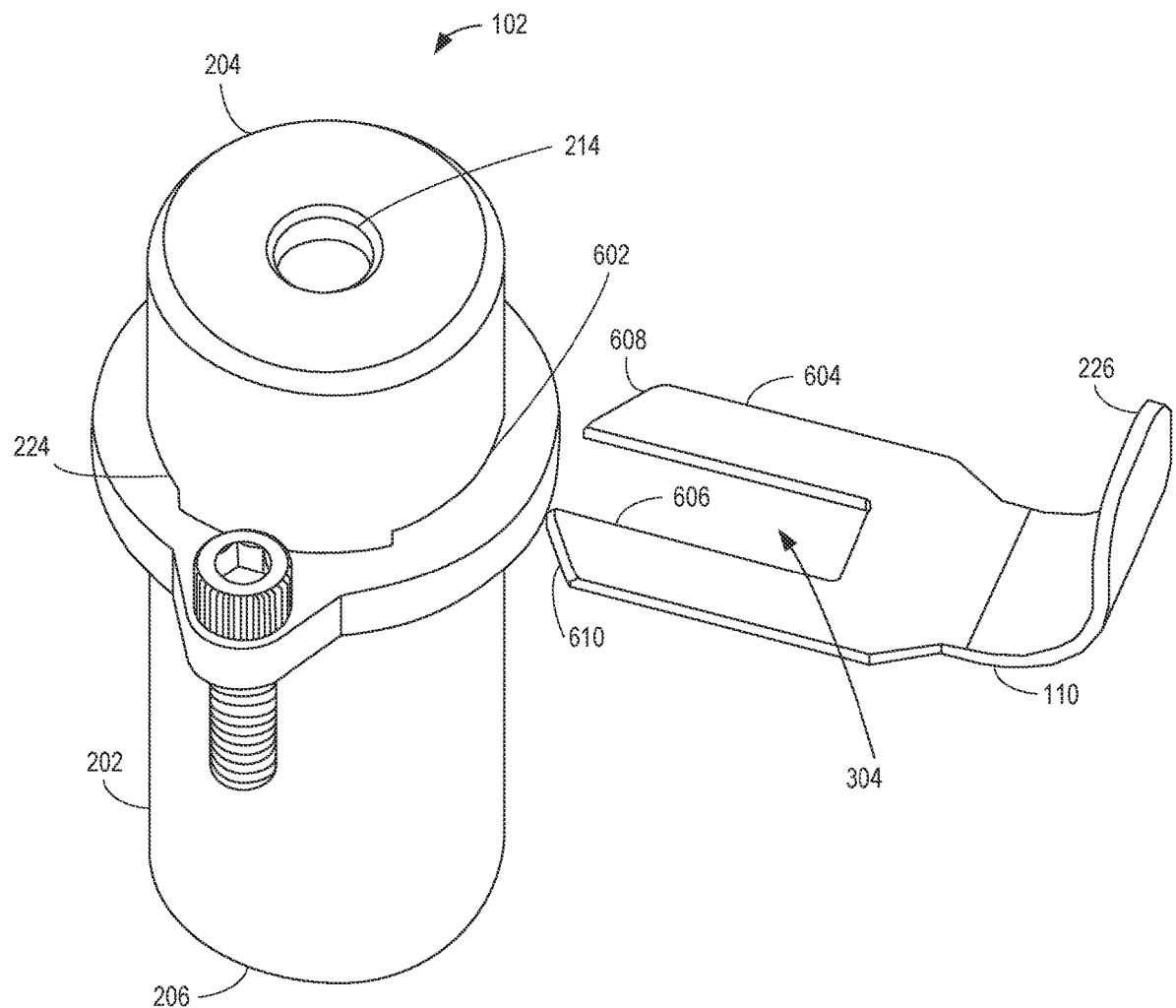
FIG. 6 depicts the retainer removed from the example valve packing cartridge assembly of FIGS. 1-5.

The packing retaining ring 308 is disposed adjacent the second end 206 of the cartridge 202 opposite a packing facing side 312 of the tines 604, 606 (FIG. 6). The packing retaining ring 308 retains the stack of packing components 400 (FIG. 4) which, in some examples, are disposed between the packing retaining ring 308 and the tines 604, 606 (FIG. 6). In other examples additional materials and/or parts (e.g., a flexible retaining ring) may retain and/or contribute to the retention of the stack of packing components 400 (FIG. 4).

Figure 4:
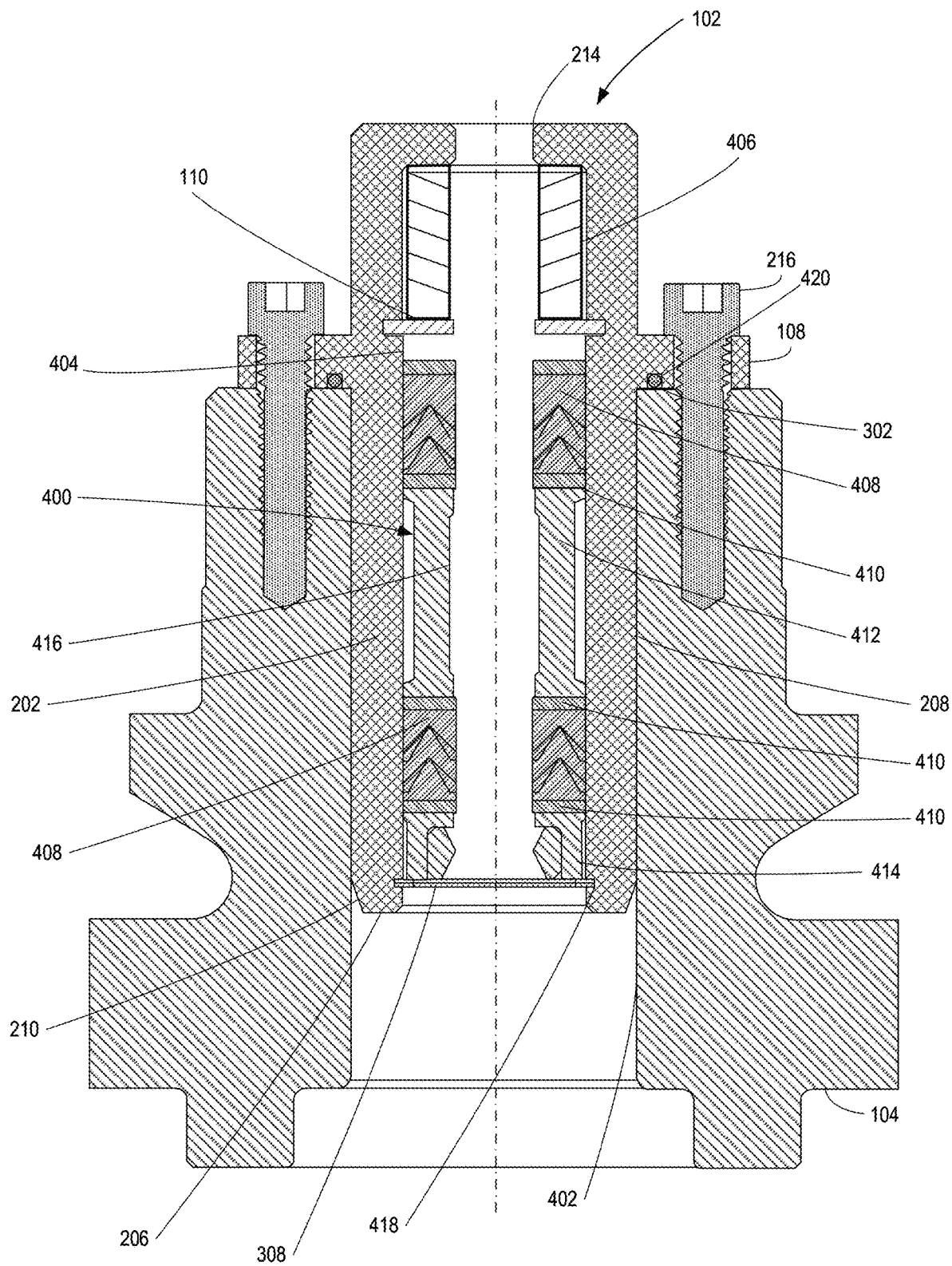
FIG. 4 is an enlarged cross-sectional view of the example valve packing cartridge assembly of FIGS. 1-3 disposed within an example bore of a bonnet with the retainer installed and the packing components not loaded.

FIG. 4 is an enlarged cross-sectional view of the example valve packing cartridge assembly 102 of FIGS. 1-3 disposed within a bore 402 of the bonnet 104 with the retainer 110 installed and the stack of packing components 400 not loaded. Inserted into the bonnet 104 is the valve packing cartridge assembly 102. Disposed within a bore 404 of the cartridge 202 are a biasing element 406, the retainer 110, and the stack of packing components 400. In some examples, the biasing element 406 is a spring (e.g., a Belleville spring). Alternatively, the biasing element 406 can be one or more springs or can be any element capable of applying a compressive load to the stack of packing components 400. In the example of FIG. 4, the stack of packing components 400 includes packing rings 408, anti-extrusion washers 410, a spacer 412, and a packing box ring 414. In addition to the example elements shown in FIG. 4, in other examples, the elements that compose the stack of packing components 400 may include any number of packing wipers, spacers (e.g., lantern rings), packing set rings, packing followers, and/or any other suitable valve packing element(s). The stack of packing components 400 may be configured in a predetermined arrangement (e.g., the arrangement in FIG. 4) and/or in any other arrangement appropriate for the application. When the stack of packing components 400 is positioned and aligned with the bore 404 of the cartridge 202, a packing stem aperture 416 is defined by the remaining cylindrical space central to the stack of packing components 400 and the bore 404 of the cartridge 202. In other examples, the packing stem aperture 416 could be an alternative shape (e.g., having a rectangular cross-section).

At the second end 206 of the valve packing cartridge assembly 102 the packing retaining ring 308 is disposed within an annular groove 418. The packing retaining ring 308 retains the stack of packing components 400 within the bore 404 of the cartridge 202. In other examples, additional materials and/or parts (e.g., a flexible retaining ring) may retain and/or contribute to the retention of the stack of packing components 400 or any other components internal to the valve packing cartridge assembly 102.

In the example of FIG. 4, the stack of packing components 400 is uncompressed, and the retainer 110 retains the biasing element 406 from applying a compressive load to the stack of packing components 400. In the illustrated example, the packing components 400 are separated or spaced from the biasing element 406. Thus, the biasing element 406 does not contact the packing components 400 when the retainer 110 is coupled with the packing cartridge assembly 202. In some examples, the packing rings 408 (e.g., and other ones of the packaging components 400 are in an uncompressed or non-deflected condition when the retainer 110 is coupled to the cartridge 202. An example method to install the valve packing cartridge assembly 102 into the bore 402 of the bonnet 104 is described below in connection with FIG. 8. In some examples, the valve packing cartridge assembly 102 is sealed against undesired leakage between the bore 402 of the bonnet 104 and the outer surface 208 of the cartridge 202 with a means for sealing (e.g., a gasket, O-rings, sealing compounds, etc.) For example, a gasket 420 can be provided at an interface of the bonnet 104 and the flange 108 of the cartridge 202. In some examples, a seal (e.g., an O-ring) can be provided on the outer surface 208 of the cartridge 202.

In additional examples, (e.g., the example detailed in FIG. 5), following the installation of the valve packing cartridge assembly 102 into the bore 402 of the bonnet 104, the valve stem 500 (FIG. 5) is installed through the central aperture 214, between the tines 604, 606 (FIG. 6) of the retainer 110, through the packing stem aperture 416 of the stack of packing components 400 and coupled to a plug or other flow control member of a valve.

Figure 5:
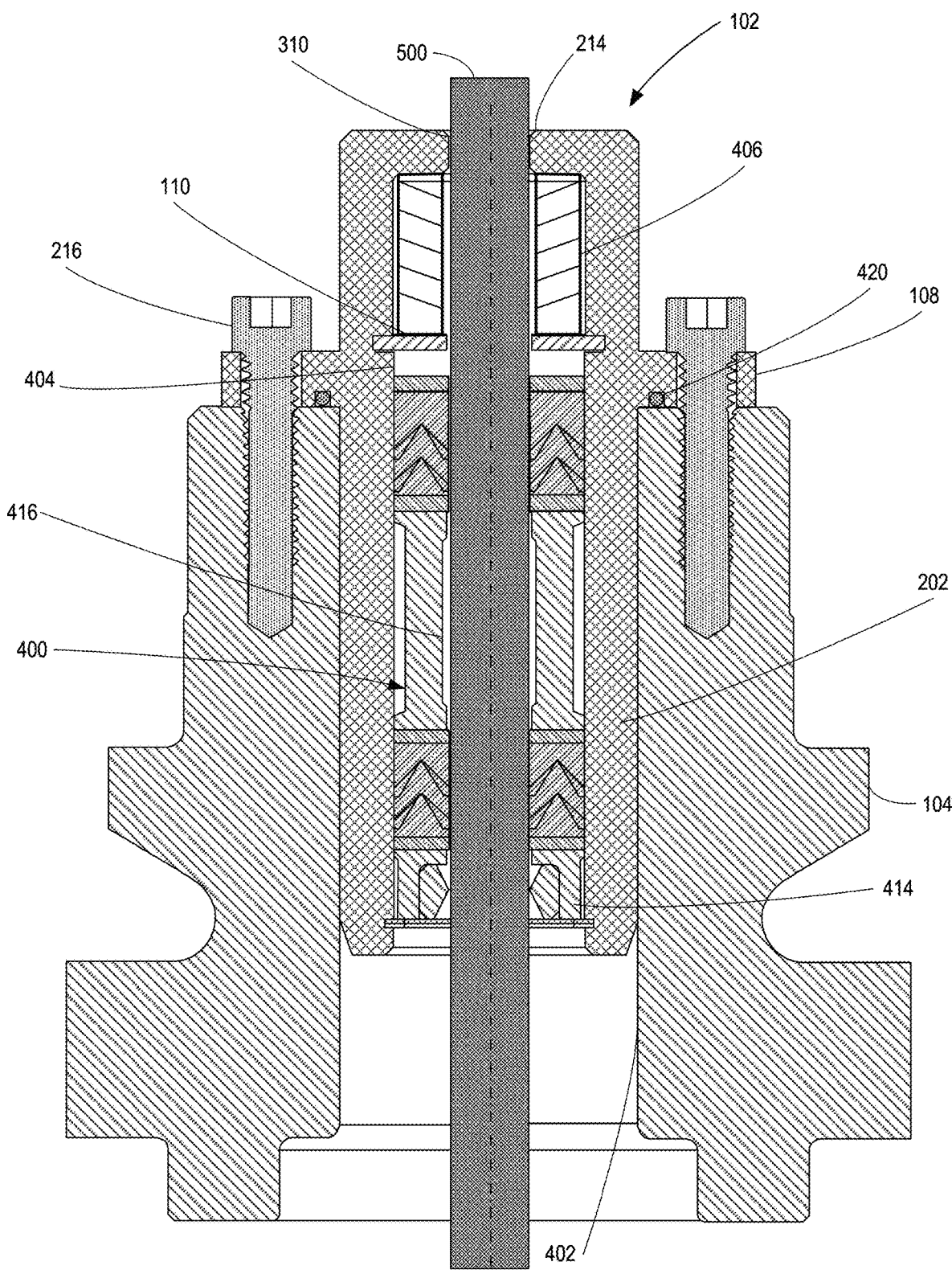
FIG. 5 depicts the assembly of FIG. 4 with a valve stem installed.

FIG. 5 depicts the valve packing cartridge assembly 102 of FIG. 4 with the valve stem 500 installed. The valve stem 500 is dimensioned to fit within the central aperture 214. The central aperture 214 has the central aperture chamfer 310 to guide the valve stem 500 during insertion. In this example, following the installation of the valve packing cartridge assembly 102 into the bore 402 of the bonnet 104, the valve stem 500 is inserted through the central aperture 214, through the packing stem aperture 416 of the stack of packing components 400, and coupled to a plug of a valve. In other examples, before the valve packing cartridge assembly 102 is inserted into the bore 402 and coupled to the bonnet 104 via the flange 108 and the bolts 216, the valve stem 500 is inserted into the bore 402 of the bonnet 104 and coupled to a plug of a valve.

In this example, following the installation of the valve stem 500 into the bonnet 104, the valve packing cartridge assembly 102 is installed over the valve stem 500 and into the bore 402 of the bonnet 104. In the example of FIG. 5, the valve stem 500 is a sliding stem. Alternatively, the valve stem 500 can instead be a rotary shaft or any other stem or shaft suitable for use with a valve. The valve stem 500 may be lubricated (e.g., using grease) to enable a low-friction installation of the valve stem 500 through the valve packing cartridge assembly 102. In some examples, the packing box ring 414 includes a wiper to remove particulate and debris from the valve stem 500 during its insertion through the central aperture 214 and through the packing stem aperture 416.

In the example of FIG. 5, the retainer 110 is disposed within the aperture 602 (FIG. 6) and retains the biasing element 406 from applying a compressive load to the stack of packing components 400. During the insertion of the valve stem 500 through the central aperture 214 and through the packing stem aperture 416 the stack of packing components 400 may remain uncompressed to allow for a low resistance (e.g., low friction) insertion of the valve stem 500 though the central aperture 214 and through the stack of packing components 400. In some examples, once the retainer 110 is removed from the aperture 602 (FIG. 6) to allow the biasing element 406 to apply a compressive load to the stack of packing components 400, the stack of packing components 400 expand radially to create a desired seal against the valve stem 500 and the bore 404 of the cartridge 202.

FIG. 6 depicts the retainer 110 removed from the example valve packing cartridge assembly 102 of FIGS. 1-5. The retainer 110 is generally tab-like, includes the tines 604, 606 and has the curved end 226 for grasping via a person's hand and/or via a tool during movement (e.g., pulling and removal). The tines 604, 606 have corresponding chamfered and/or beveled ends 608, 610 to facilitate the installation of the retainer 110 into the aperture 602 (e.g., a slot) and the corresponding apertures 222, 224 (FIG. 2) during the initial assembly of the valve packing cartridge assembly 102. The rectangular space 304 between the tines 604, 606 allows the valve stem 500 to pass unobstructed past the tines 604, 606 during installation of the valve stem 500 and allows the tines 604, 606 to pass unobstructed past the valve stem 500 during the removal of the retainer 110 from the cartridge 202. In some examples, prior to the insertion of the tines 604, 606 of the retainer 110 into the aperture 602, the tines 604, 606 may be lubricated (e.g., using grease) to enable a low-friction installation and/or removal of the retainer 110 into and/or from the cartridge 202.

While in the example of FIG. 6 the retainer 110 is generally tab-like, the retainer 110 may be any other retaining element (e.g., a bar, a pin, etc.). The removal of the retainer 110 includes the withdrawal of the tines 604, 606 from the corresponding apertures 222, 224 and through the aperture 602. In this example, the removal of the tines 604, 606 of the retainer 110 from the valve packing cartridge assembly 102 releases the biasing element 406 (FIG. 4) to apply a predetermined compressive load to the stack of packing components 400 (e.g., upon the completion of the installation of the valve packing cartridge assembly 102 into a valve).

In one example, the insertion of the valve stem 500 through the valve packing cartridge assembly 102 starts at the first end 204 and continues through the central aperture 214 prior to the removal of the retainer 110. In an additional example, the valve stem 500 is first installed in a valve such that the insertion of the valve stem 500 through the valve packing cartridge assembly 102 starts at the second end 206, continues through the packing stem aperture 416 and exits through the central aperture 214 prior to the removal of the retainer 110. In these examples, the retainer 110 is removed once the valve packing cartridge assembly 102 is installed in a valve, and once the valve stem 500 is disposed through the valve packing cartridge assembly 102.

Figure 7:
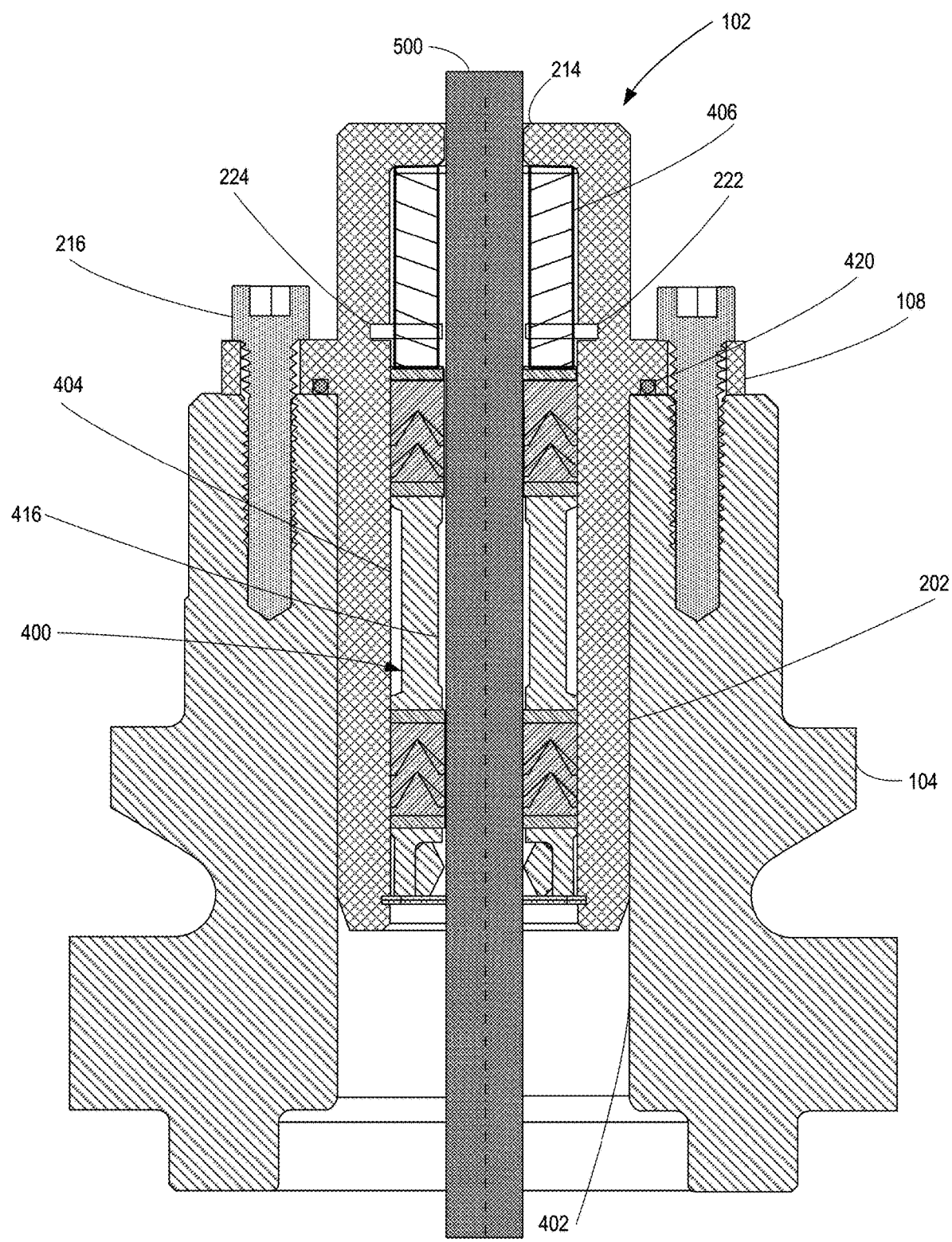
FIG. 7 is a cross-sectional view of the assembly of FIG. 5 with the retainer removed and the valve packing components loaded by the spring.

FIG. 7 is a cross-sectional view of the assembly of FIG. 5 with the retainer 110 removed and the stack of packing components 400 loaded by the biasing element 406. In the example of FIG. 7, the valve packing cartridge assembly 102 is installed in the bore 402 and coupled to the bonnet 104 via the flange 108 and the bolts 216. Additionally, the valve stem 500 is disposed through the central aperture 214 and the packing stem aperture 416 and is installed in a valve.

In this example, the retainer 110 has been moved to withdraw the tines 604, 606 (FIG. 6) from the corresponding apertures 222, 224 and through the aperture 602 to allow the biasing element 406 to apply a predetermined compressive load to the stack of packing components 400. The stack of packing components 400 (e.g., the packing seals 408), when compressed by the biasing element 406, may expand radially to create a desired seal against the valve stem 500 and the bore 404 of the cartridge 202. As a result, the stack of packing components 400 (e.g., the packing seals 408) radially expanded under the load of the biasing element 406 to provide a seal a seal around a valve stem and an inner surface of the cartridge to prevent process fluid flowing through a valve body from leaking past the stem and the inner surface of the cartridge 202 and to the surrounding environment.

In some examples, the seal created by the stack of packing components 400 under a compressive load from the biasing element 406 allows for the movement of the valve stem 500. For example, when the example valve stem 500 is a sliding stem, the valve stem 500 can slide within the packing stem aperture 416 and pass through the central aperture 214. Alternatively, if the valve stem 500 is a rotary shaft, the valve stem 500 can rotate within the packing stem aperture 416 and the central aperture 214. In other examples the type and movement of the valve stem 500 may be that of any other stem or shaft suitable for use with a valve. In these examples, the movement of the valve stem 500 can occur without compromising the desired integrity of the seal between the stack of packing components 400 (e.g., the packing seals 408), the valve stem 500, and the bore 404 of the cartridge 202.

Figure 8:
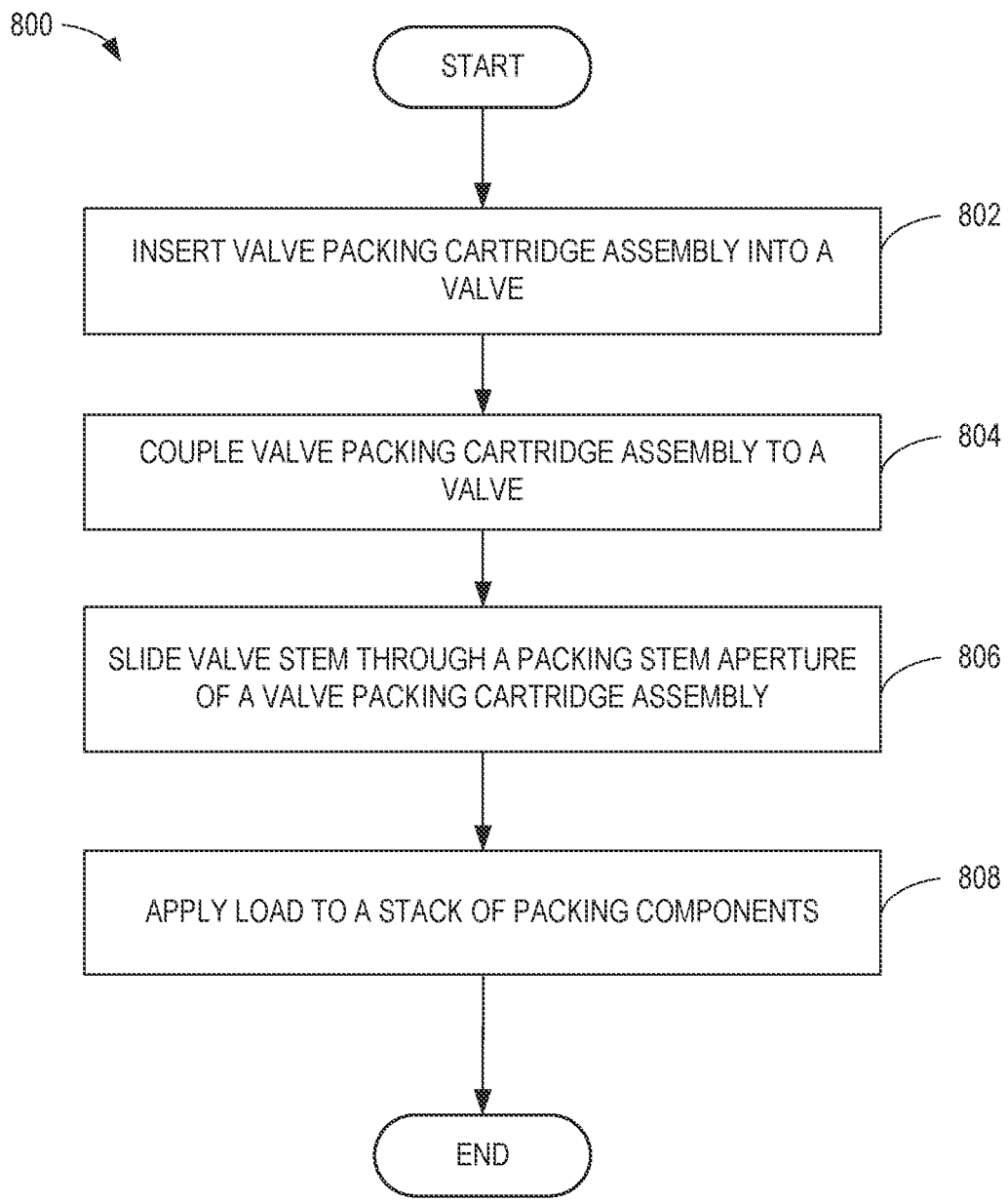
FIG. 8 is a flow diagram of an example method that can be used to implement the example valve packing cartridge assembly described herein.

FIG. 8 is a flow diagram of an example method 800 that can be used to implement the example valve packing cartridge assembly 102 described herein. The example method 800 may be implemented to install the example valve packing cartridge assembly 102 into the example valve 100 without damaging the valve packing cartridge assembly 102 or the example valve 100. The example method 800 may prevent undesired fluid leaks in the valve 100 and facilitate the installation of a valve packing (e.g., the valve packing cartridge assembly 102) while eliminating the possibility of installing components in the wrong order or orientation, damaging components, and/or improperly loading the components. Additionally, the example method 800 may be performed by hand, however, in other examples this method may be completed with the assistance of additional equipment, materials, and/or tools.

The example method 800 begins with first inserting a valve packing cartridge assembly into a valve (block 802). In some examples, the insertion of the valve packing cartridge assembly 102 into a valve (e.g., the valve 100) first includes aligning the second end 206 with the bore 402 of the bonnet 104 facilitated by the chamfered portion 210. The second end 206 extends to a desired depth within the bore 402 of the bonnet 104 determined by the distance the second end 206 travels during the insertion of the valve packing cartridge assembly 102 until the flange mating surface side 302 meets the surface of the bonnet 104. Additionally, the cartridge 202 may be lubricated (e.g., using grease) to enable a low-friction installation of the valve packing cartridge assembly 102 into the bore 402. In some examples, the insertion of the valve packing cartridge assembly 102 into the bore 402 of the bonnet 104 is achieved by hand and/or via a tool. In some examples, the valve packing cartridge assembly 102 is installed into the bore 402 after the valve stem 500 is installed. During the insertion of the valve packing cartridge assembly 102 into the bore 402 the biasing element 406 is retained by the retainer 110 and the stack of packing components 400 remain uncompressed.

The example method 800 includes coupling a valve packing cartridge assembly to a valve (block 804). In some examples, following the insertion of the valve packing cartridge assembly 102 into the bore 402 of the bonnet 104, the valve packing cartridge assembly 102 is coupled with the bonnet 104 via the flange 108 and the bolts 216. In other examples, the valve packing cartridge assembly 102 is coupled to the bonnet 104 via other means (e.g., a flange separate from the valve packing cartridge assembly 102). Additionally, the bolts 216 may be tightened to a predetermined threshold.

The example method 800 includes sliding a valve stem through a packing stem aperture of a valve packing cartridge assembly (block 806). In some examples, once the valve packing cartridge assembly 102 is coupled to the bonnet 104, the valve stem 500 can be slid through the packing stem aperture 416 by first aligning the valve stem 500 with the central aperture 214 via the central aperture chamfer 310 and sliding the valve stem 500 through the packing stem aperture 416 starting at the first end 204. In an additional example, the valve stem 500 is installed in a valve prior to the installation of the valve packing cartridge assembly 102 such that sliding the valve stem 500 through the packing stem aperture 416 begins at the second end 206, continues through the packing stem aperture 416 and exits through the central aperture 214. The valve stem 500 may be lubricated (e.g., using grease) to enable a low-friction installation of the valve stem 500 through the valve packing cartridge assembly 102. In this example, the valve stem 500 is a sliding stem, however, the valve stem 500 can instead be a rotary shaft or any other stem or shaft suitable for use with a valve.

The example method 800 includes the application of a load to a stack of packing components (block 808). In some examples, the retainer 110 is moved to withdraw the tines 604, 606 (FIG. 6) from the corresponding apertures 222, 224 and through the aperture 602 to allow the biasing element 406 to apply a predetermined compressive load to the stack of packing components 400. Additionally, the stack of packing components 400, when compressed by the biasing element 406, may expand radially to create a desired seal against the valve stem 500 and the bore 404 of the cartridge 202. In additional examples, the seal created by the stack of packing components 400 under a compressive load from the biasing element 406 allows for the movement of the valve stem 500 without compromising the desired integrity of the seal between the stack of packing components 400, the valve stem 500, and the bore 404 of the cartridge 202.

From the foregoing, it will be appreciated that valve packing apparatus and related methods to install valve packing components have been disclosed that functionally prevent improper valve packing component installation (e.g., components installed in the incorrect order and/or backwards, misalignment of packing components, inaccurate application of load to the packing components, etc.) and/or damage to the valves and/or the packing components. Known packing installation and servicing processes are difficult and error-prone, particularly in a field service situation. Some example methods and apparatus described herein enable a person to ensure the installation of valve packing components in the correct order and orientation. Further, some disclosed examples ensure a precise, predetermined compressive load is applied to the packing components while eliminating the need for a person to manually adjust the load during installation of the valve packing components. Further still, some disclosed examples enable a person to service a valve packing by removing the packing components from a bore of a valve as an assembly. By enabling a person to correctly (e.g., correct orientation, alignment, order, etc.) install a valve packing and apply the desired load to the stack of packing components without manual adjustment or damage to a valve, the installation of valve packing becomes more efficient, increasing the performance of the valve and/or reducing and/or preventing adverse effects (e.g., leaks in a fluid valve, undesired changes in pressure, and/or damage to valves and/or packing components) that could have otherwise been caused by known valve packing installation apparatus and/or procedures.

Example methods, apparatus, systems, and articles of manufacture to install a valve packing are disclosed herein. Further examples and combination thereof include the following:

Example 1 includes an apparatus to install a valve packing comprising a cartridge including packing components and a spring, the cartridge dimensioned to fit in a bore of a bonnet of a valve, and a retainer disposed in an aperture of the cartridge to prevent the spring from applying a compressive load to the packing components, the retainer, when removed from the aperture, to release the spring to apply a predetermined compressive load to the packing components.

Example 2 includes the apparatus of example 1 wherein the retainer is a tab and the aperture is a slot.

Example 3 includes the apparatus of example 1 wherein the retainer has a first end and a second end, where the first end is forked with two tines and the second end is curved.

Example 4 includes the apparatus of example 3, wherein the retainer is disposed in the aperture, and the first end extends through a diameter of the cartridge.

Example 5 includes the apparatus of example 3, wherein the tines are spaced apart to enable a spring compressor to compress the spring.

Example 6 includes the apparatus of example 1, further including a retaining ring in the cartridge to retain the packing components within the cartridge.

Example 7 includes the apparatus of example 1, wherein the compressive load on the packing components is to form a seal around a valve stem and an inner surface of the cartridge.

Example 8 includes the apparatus of example 1, further including a seal to seal the cartridge to the bonnet.

Example 9 includes the apparatus of example 1, wherein the cartridge includes a flange to couple the cartridge to the bonnet.

Example 10 includes the apparatus of example 1, wherein the cartridge is a unitary body.

Example 11 includes an apparatus to install a valve packing comprising a cylindrical tube having a first end and a second end, the tube having an outer surface dimensioned to fit within a bore of a valve, a biasing member disposed within the tube at the first end of the tube, packing components disposed within the tube adjacent the biasing member, and a retainer to hold the biasing member in a compressed state to prevent the biasing member from contacting the packing components, the retainer to be moved to enable the biasing member to apply a load to the packing components after the cylindrical tube has been inserted into the bore of the valve.

Example 12 includes the apparatus of example 11, wherein the biasing member includes a tab, the tab to extend through a diameter of the cylindrical tube proximate the first end.

Example 13 includes the apparatus of example 11, wherein the load applied to the packing components by the biasing member requires no adjustment to enable a desired operation of the valve.

Example 14 includes the apparatus of example 11, wherein the cylindrical tube includes a flange.

Example 15 includes the apparatus of example 11, wherein one end of the retainer is forked and another end of the retainer has a curved end for grasping to remove the retainer from the cylindrical tube.

Example 16 includes the apparatus of example 11, wherein the cylindrical tube is sealed against a bore of a valve.

Example 17 includes the apparatus of example 11, wherein the cylindrical tube, the biasing member, and the packing components can be removed from the bore of a valve as an assembly.

Example 18 includes an apparatus to install a valve packing comprising means for applying a predetermined compressive load to packing components and means for retaining the means for applying the predetermined compressive load.

Example 19 includes the apparatus of example 18, wherein the means for applying the predetermined compressive load to the packing components includes a spring.

Example 20 includes the apparatus of example 19, wherein the means for retaining the means for applying is a tab.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus to install a valve packing comprising:
   a cartridge having a first end and a second end, the first end dimensioned to fit in a bore of a bonnet of a valve, the cartridge including:

packing components;

a flange to couple the cartridge to the bonnet;

an aperture disposed between the second end of the cartridge and the flange; and a spring; and a retainer disposed in the aperture of the cartridge to prevent the spring from applying a compressive load to the packing components, the retainer, when removed from the aperture, to release the spring to apply a predetermined compressive load to the packing components.

2. The apparatus of claim 1, wherein the retainer is a tab and the aperture is a slot.

3. The apparatus of claim 1, wherein the retainer has a first retainer end and a second retainer end, the first retainer end including a forked surface with two tines, and the second retainer end including a curved surface continuous with the forked surface.

4. The apparatus of claim 3, wherein when the retainer is disposed in the aperture, the first retainer end extends through a diameter of the cartridge.

5. The apparatus of claim 3, wherein the tines are spaced apart to enable a spring compressor to compress the spring.

6. The apparatus of claim 1, further including a retaining ring in the cartridge to retain the packing components within the cartridge.

7. The apparatus of claim 1, wherein the compressive load on the packing components is to form a seal around a valve stem and an inner surface of the cartridge.

8. The apparatus of claim 1, further including a seal to seal the cartridge to the bonnet.

9. The apparatus of claim 1, wherein the cartridge is a unitary body.

10. The apparatus of claim 1, wherein the cartridge further includes an end cap at the first end, the spring seated in the end cap.

11. An apparatus to install a valve packing, comprising:

a cylindrical tube having a first end and a second end, the cylindrical tube having an outer surface dimensioned to fit within a bore of a valve;

a biasing member disposed within the cylindrical tube at the first end of the cylindrical tube;

packing components disposed within the cylindrical tube adjacent the biasing member; and a retainer to hold the biasing member in a compressed state to prevent the biasing member from contacting the packing components, wherein the retainer is to be moved to enable the biasing member to apply a load to the packing components after the cylindrical tube has been inserted into the bore of the valve.

12. The apparatus of claim 11, wherein the biasing member includes a tab, the tab to extend through a diameter of the cylindrical tube proximate the first end.

13. The apparatus of claim 11, wherein the load applied to the packing components by the biasing member requires no adjustment to enable a desired operation of the valve.

14. The apparatus of claim 11, wherein the cylindrical tube includes a flange to couple the cylindrical tube to the valve.

15. The apparatus of claim 11, wherein the retainer includes a forked end and a curved end for grasping to remove the retainer from the cylindrical tube, the curved end opposite the forked end.

16. The apparatus of claim 11, wherein the cylindrical tube is sealed against the bore of the valve.

17. The apparatus of claim 11, wherein the cylindrical tube, the biasing member and the packing components can be removed from the bore of the valve as an assembly.

18. The apparatus of claim 11, further including a ring disposed in an annular groove at the second end of the cylindrical tube, the ring retaining the packing components within the cylindrical tube.

19. An apparatus to install a valve packing comprising:

a cartridge to be disposed within a bore of a bonnet of a valve, the cartridge including a first end and a second end, the cartridge including:

means for applying a predetermined compressive load to packing disposed at the first end; and means for sealing a valve stem; and first means for retaining the means for applying the predetermined compressive load in a compressed state to prevent the means for applying the predetermined compressive load from contacting the means for sealing, the first means for retaining to be removed from the cartridge to enable the means for applying the predetermined compressive load to apply a load to the means for sealing after the cartridge has been coupled to the bore of the valve.

20. The apparatus of claim 19, further including second means for retaining the means for sealing within the cartridge, the second retaining means disposed in a groove at the second end of the cartridge.

* * * * *